(12) United States Patent
Hiji et al.

(10) Patent No.: US 7,042,536 B2
(45) Date of Patent: May 9, 2006

(54) LIQUID CRYSTAL DISPLAY ELEMENT

(75) Inventors: Naoki Hiji, Ebina (JP); Shigeru Yamamoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 64 days.

(21) Appl. No.: 10/137,430

(22) Filed: May 3, 2002

(65) Prior Publication Data

US 2003/0095228 A1  May 22, 2003

(30) Foreign Application Priority Data

Nov. 16, 2001  (JP) .............................. 2001-351769

(51) Int. Cl.
*G02F 1/1335* (2006.01)
*C09K 19/02* (2006.01)

(52) U.S. Cl. .......................... 349/98; 349/117; 349/185
(58) Field of Classification Search ........ 349/117–119, 349/96–98, 175–176, 185
See application file for complete search history.

(56) References Cited

U.S. PATENT DOCUMENTS

| 5,574,593 | A | * | 11/1996 | Wakita et al. | 359/259 |
| 5,796,454 | A | * | 8/1998 | Ma | 349/98 |
| 6,188,455 | B1 | * | 2/2001 | Yamamoto | 349/76 |
| 6,462,805 | B1 | * | 10/2002 | Wu et al. | 349/169 |
| 6,469,768 | B1 | * | 10/2002 | Lee | 349/177 |
| 2002/0089479 | A1 | * | 7/2002 | Sato et al. | 345/87 |
| 2003/0151580 | A1 | * | 8/2003 | Ma | 345/96 |

FOREIGN PATENT DOCUMENTS

JP  6-27496  * 2/1994
JP  A 11-344730  12/1999

* cited by examiner

*Primary Examiner*—Dung T. Nguyen
(74) *Attorney, Agent, or Firm*—Oliff & Berridge, PLC

(57) ABSTRACT

A liquid crystal display element has a liquid crystal layer made of cholesteric liquid crystal and a circularly polarizing plate for circularly polarizing light. The liquid crystal layer has the following relation:

$$d/p > 1.5$$

where d is a thickness of the liquid crystal layer and p is a helical pitch of the cholesteric liquid crystal.

10 Claims, 5 Drawing Sheets

LIQUID CRYSTAL DISPLAY ELEMENT

The present disclosure relates to the subject matter contained in Japanese Patent Application No. 2001-351769 filed Nov. 16, 2001, which is incorporated herein by reference in its entirety.

BACKGROUND OF THE INVENTION

1. Field of the Invention

The present invention relates to a liquid crystal display element used for OA devices and the like, and more particularly to a liquid crystal display device element of the reflection type which presents display by utilizing external light.

2. Description of the Related Art

Recently, with development of information technology and with awareness of the environmental issue, there is an increasing demand of developing display devices which is operable at low power consumption and with good visibility. The liquid crystal display (LCD) element of the reflection type using a cholesteric liquid crystal material is capable of performing display by using only external light. Therefore, there is no need of using the electric power for back light, and the power consumption by the LCD device is lessened. In this respect, the LCD element is suitable for the display of portable information device. The market places its hopes on further development of the LCD element. In particular, the reflection type LCD element using a memory-type liquid crystal elements is capable of sustaining the display once written without the help of the power source, except the drive power necessary at the rewriting time. Accordingly, there is no need of using the refreshing electric power, and hence a further reduction of the power consumption is corresponding achieved. In the reflection type LCD device using the non-memory type liquid crystal elements, when it is driven in a simple matrix driving manner, the inter-pixel crosstalk comes into problem. In this type of the LCD device, there is limited in the number of scanning electrodes. To avoid such a limitation, there is an approach to use active elements, such as thin film transistors, thin film diodes, or MIM (metal-insulator-metal) elements. However, the approach suffers from other problems; refreshing power consumption is inevitable, and the cost to manufacture increases as the result of using those active elements. On the other hand, the memory-type liquid crystal display element is free from the crosstalk problem, and hence, the cost increase problem resulting from the use of active elements. Further, this type of LCD device has an advantage of manufacturing liquid crystal display elements of large display capacity at low cost.

A bistable twisted nematic (BTN) display element is known as a variation of the memory-type liquid crystal display element.

Japanese unexamined patent publication No.Hei 11-344730 discloses a reflection type liquid crystal display based on the BTN system.

FIG. 1 is a sectional view showing a structure of a BTN type liquid crystal display element.

A liquid-crystal display element 11 shown in FIG. 1 includes a planar liquid crystal layer 3, and a transparent obverse surface electrode 2a formed on a substrate 1a and a light reflecting reverse electrode 2b formed on a substrate 1b. Those electrodes support the obverse side and the reverse side of the liquid crystal layer 3, respectively. An alignment layer 4a is layered between the obverse surface electrode 2a and the liquid crystal layer 3, and an alignment layer 4b is layered between the reverse electrode 2b and the liquid crystal layer 3. Those alignment layers have been subjected to a rubbing treatment to be in anti-parallel orientation. A circularly polarizing plate 5 including a ¼ wavelength plate and a linear polarizer is provided on the obverse side of the substrate 1a. A power source 20 is inserted between the obverse surface electrode 2a and the reverse electrode 2b, and applies a predetermined voltage to between the obverse surface electrode 2a and the reverse electrode 2b.

The liquid crystal layer 3 is made of cholesteric liquid crystal having a helical structure, and a ratio d/p is set at 0.5 (where d : thickness of the liquid crystal layer 3, and p is a helical pitch of the liquid crystal). The twisted orientation of 180° A is stable for the initial orientation of liquid crystal molecules. A high voltage is applied from the power source 20 to those electrodes to reset the liquid crystal molecules such that the major axis of the liquid crystal molecules is oriented to be perpendicular to the substrates 1a and 1b. Then, a predetermined select voltage is applied from the power source 20 to the electrodes. As a result, bistable states, a twisted orientation state of 0° A or a twisted orientation state of 360° B, appear depending on the select voltage. The display can be executed by making use of the two orientation states A and B.

When the select voltage is lower than a threshold voltage, the orientation state of the liquid crystal molecules is changed to the twisted orientation state of 360° B having no birefringence effect, by the backflow effect. When the select voltage is higher than the threshold voltage, the orientation of the liquid crystal molecules is changed to the twisted orientation state of 0° A having the birefringence effect.

In the twisted orientation state of 360° B, if the product (retardation) of multiplying the thickness "d" of the liquid crystal layer 3 and the birefringence anisotropy is set to be smaller than the wavelength of light, Maugin condition is not satisfied. The liquid crystal layer may be handled as an optically isotropic layer. Accordingly, incident light 1 coming from exterior passes through the circularly polarizing plate 5 to be circularly polarized light C1. The circularly polarized light is reflected, by the reverse electrode 2b as by a mirror, into a reversely turned circularly polarized light C2. The reflected light C2 by the reverse electrode 2b is absorbed by the circularly polarizing plate 5 to present dark display. In the twisted orientation state of 0° A, if the retardation of the liquid crystal layer 3 is ¼λ, the external incident light I passes through the circularly polarizing plate 5 to be circularly polarized light C1. When it passes through the liquid crystal layer, it is transformed into linearly polarized light S. The linearly polarized light S reflected by the reverse electrode 2b passes through the liquid crystal layer again and is transformed into circularly polarized light C1. The circularly polarized light passes through the circularly polarizing plate 5 to present bright display.

The bistable states utilized by the BTN system are sustained for about several hundred ms. For this reason, it is impossible to sustain the image for a long time in a non-discharging state.

Another variation of the memory-type liquid crystal display element is a selective reflection type liquid crystal display element, which utilizes the selective reflection of cholesteric liquid crystal.

FIG. 2 is a cross sectional view showing a structure of a liquid crystal display element having the selective reflection function.

A liquid-crystal display element 12 shown in FIG. 2 includes a liquid crystal layer 3 made of cholesteric liquid crystal, and a transparent obverse surface electrode 2a formed on a substrate 1a and a reverse electrode 2b formed on a substrate 1b. Those electrodes support the obverse side and the reverse side of the liquid crystal layer 3, respectively. The liquid-crystal display element further includes a light absorbing layer 7 for absorbing light, which is formed on the rear side of the substrate 1b. An alignment layer 4a is layered between the obverse surface electrode 2a and the liquid crystal layer 3, and an alignment layer 4b is layered between the reverse electrode 2b and the liquid crystal layer 3. A power source 20 is inserted between the obverse surface electrode 2a and the reverse electrode 2b, and applies a predetermined voltage to between the obverse surface electrode 2a and the reverse electrode 2b.

The alignment layers 4a and 4b in the liquid-crystal display element 12 are provided for uniformizing the display, and improving the reflectivity at the time of bright display and contrast. If the alignment layers formed by uniaxial orientation processing the alignment layers 4a and 4b by a rubbing treatment or the like are used, the memory property based on the liquid crystal layer 3 is lost or the contrast of the display lowers. For this reason, usually, there is no case that the alignment layers having undergone the uniaxial orientation processing are used for both sides of the liquid crystal layer 3.

In the liquid crystal display element of the BTN type, the helical pitch of the liquid crystal is several μm to several tens μm. In the liquid crystal display element of the selective reflection type, the helical pitch ranges from 0.2 μm to 0.5 μm. Further, a ratio of the thickness "d" of the liquid crystal layer to the helical pitch "p" (i.e., d/P) must be selected to be within a range from approximately 5 to 20. If d/p is smaller than 5, the reflectivity at the bright display time decreases. If it is larger than 20, the drive voltage must be increased. This results in remarkable increase of cost of constructing the drive circuit.

The cholesteric liquid crystal has a nature, called selective reflection, that it makes a kind of bragg reflection of a circularly polarized light whose wavelength is equal to the helical pitch "p" and has the same rotational direction as that of the helix. Accordingly, if the helical pitch "p" is selected to be equal to a specific wavelength within the visible wavelength region, the cholesteric liquid crystal reflects light of the same color as that of the specific wavelength.

In the figure, the cholesteric liquid crystal exhibits bistable states, a planar orientation (P orientation) P in which the helical axis of the liquid crystal molecule is substantially parallel to the normal line of the substrate, and a focal conic orientation (F orientation) F in which the helical axis of the liquid crystal molecule is vertical to the normal line of the substrate. In the P orientation, light I incident on the liquid crystal layer 3 is selectively reflected and color is visually presented. In the focal conic orientation F, the incident light I passes through the liquid crystal layer, so that if the light absorbing layer 7 on the reverse side of the substrate 1b colored black, black color is visually presented. In this case, for the switching of the P orientation to and from the orientation F, high voltage is first applied to the display element so that the liquid crystal molecules are orientated in the direction vertical to the substrate (the liquid crystal molecules are reset), and then a predetermined select voltage is applied to the display element. In turn, the P orientation or the focal conic orientation F is set up depending on the applied select voltage.

The switching procedure of the display element under discussion is similar to that of the BTN type display element shown in FIG. 1, but is different from the latter in mechanism.

When the select voltage is lower than a predetermined threshold voltage, the molecules of the cholesteric liquid crystal are orientated to have the P planar orientation which is topologically continuous to the perpendicular orientation state set up by application of the high voltage. The change to the P orientation occurs irrespective of presence or absence of the anchoring at the boundary between the alignment layers 4a and 4b of the liquid crystal layer 3. This is different from the P orientation of the liquid crystal molecule caused by the backflow effect dependent on a specific anchoring. When the select voltage is higher than the threshold voltage, the liquid crystal resumes the helical structure, and the rotational torque caused by the positive dielectric anisotropy acts and the helical axis rotates, so that the orientation of the liquid crystal molecule changes to the F orientation.

In the liquid crystal display of the selective reflection type, the bistable states of the P orientation and F orientation are permanently sustained, and the long-time holding of the image is possible. Since the polarizing plate is not required, the display is bright. Since the color filter is not used, the display element presents bright colored display. The display element presents halftone display if the P orientation and the F orientation are stabilized in a mixed state. However, the black and white display is difficult since the display is colored with the color of a specific wavelength. Further, the d/p must be 10 or higher to secure a sufficient reflectivity. In this respect, the drive voltage must be high.

Accordingly, an object of the present invention is to provide a liquid crystal display element, which can visually present display in black and white, and sustain an image for a long time in a powerless state.

SUMMARY OF THE INVENTION

To achieve the above object, there is provided a liquid crystal display element having a liquid crystal layer made of cholesteric liquid crystal, a first circularly polarizing plate for circularly polarizing light. The liquid crystal layer has the following relation:

$$d/p > 1.5$$

where d is a thickness of the liquid crystal layer and p is a helical pitch of the cholesteric liquid crystal.

In a preferred embodiment, the liquid crystal layer has a planar shape and includes first and second surfaces and a boundary of at least one of the first and second surfaces has the anchoring strength in relation to an axis to which the liquid crystal layer is easily aligned, the anchoring strength is not more than $1/10^4$ J/m². The axis to which the liquid crystal layer is easily aligned means a direction to which the liquid molecule has a tendency to spontaneously align. The axis exists in a surface which is substantially parallel to the first surface.

In another preferred embodiment, the liquid crystal layer has a planar shape and includes first and second surfaces, at least one of the first and second surfaces has a uniaxial orientation property, and a boundary of the at least one of the first and second surfaces has the anchoring strength in relation to the orientation axis is smaller than $1/10^4$ J/m².

In a further preferred embodiment, the liquid crystal layer selectively reflects incident light and a rotating direction of a vibrating plane of the selectively reflected light is the same as that of a vibrating plane of light absorbed by the first circularly polarizing plate.

Preferably, the liquid crystal display element further has a light reflection layer for reflecting light. The liquid crystal layer includes first and second surfaces, the first circularly polarizing plate is laminated on the first surface, and the light reflection layer is laminated on the second surface.

Preferably, the liquid crystal layer includes a first electrode on the first surface and the light reflection layer is a second electrode.

In a further embodiment, the retardation of the liquid crystal layer is not less than 220 nm and not more than 330 nm.

In an additional predetermined embodiment, the liquid crystal display element further has a second circularly polarizing plate for circularly polarizing light. The liquid crystal layer includes first and second surfaces, the first and second circularly polarizing plates are laminated on the first and second surfaces, respectively, and polarizing axes of the first and second circularly polarizing plates are mutually orthogonal to each other.

Preferably, the retardation of the liquid crystal layer is not less than 440 nm and not more than 660 nm.

In another preferred embodiment, the liquid crystal display element further has a phase compensating plate having the extraordinary light axis parallel to a normal axis of the first circularly polarizing plate. The phase compensating plate is laminated between the liquid crystal layer and the first circularly polarizing plate and the phase compensating plate includes a positive uniaxial optical medium for optically compensating contrast in relation to oblique light, the positive uniaxial optical medium is equal to a plane developed by a director of the liquid crystal layer.

In a further preferred embodiment, the circularly polarizing plate includes a lamination of a linearly polarizing plate for allowing light to uniaxially pass therethrough and a ¼ wavelength plate for retarding the phase of a vibrating plane of light and refractive index of the ¼ wavelength plate in a thickness direction thereof is larger than refractive index of the ¼ wavelength plate in any direction on a plane, which is on the ¼ wavelength plate and contacts with the linearly polarizing plate.

BRIEF DESCRIPTION OF THE DRAWING

The exemplary embodiments will be described based on the drawings, in which like reference numerals represent like parts, and wherein.

DETAILED DESCRIPTION OF THE PREFERRED EMBODIMENTS

The preferred embodiments of the liquid crystal display elements according to the present invention will be described.

Figure 1:
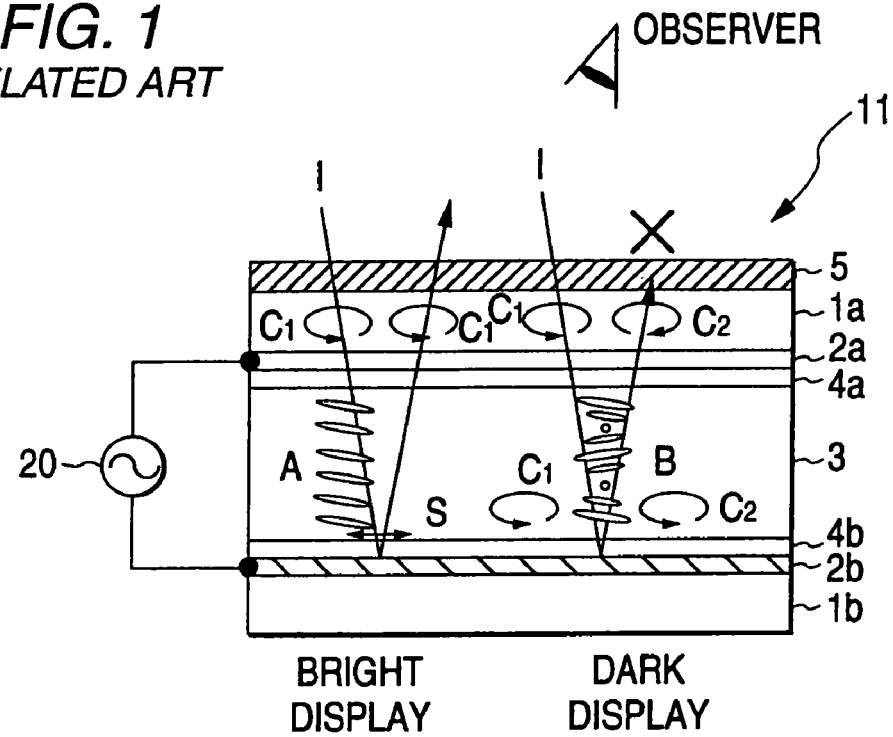
FIG. 1 is a sectional view showing a structure of a BTN type liquid crystal display element.
Figure 2:
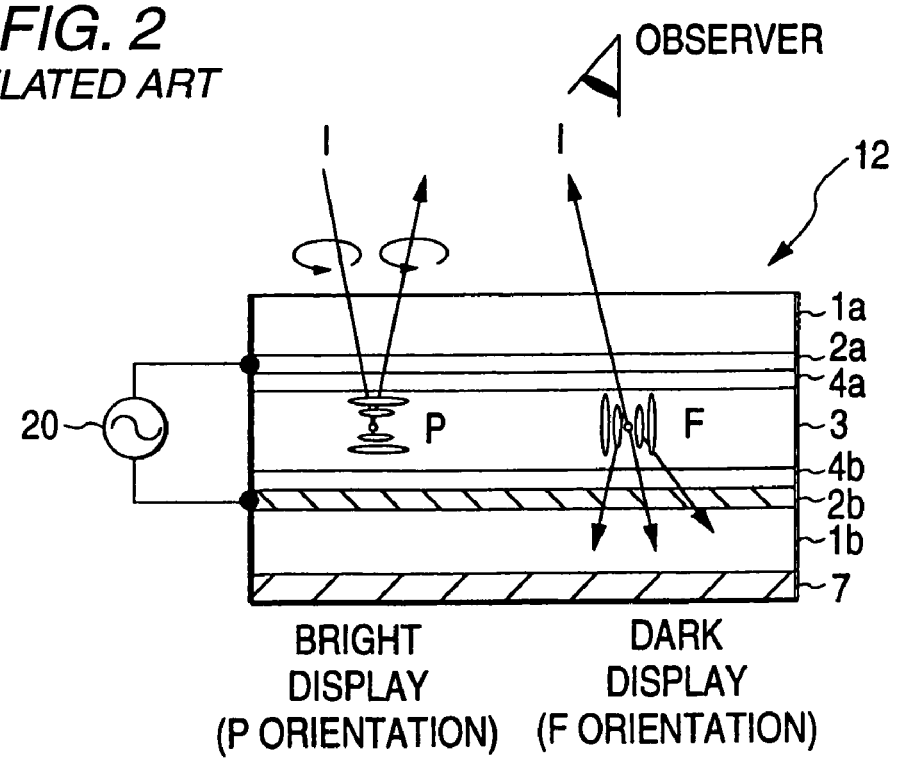
FIG. 2 is a cross sectional view showing a structure of a liquid crystal display element having a selective reflection function.
Figure 3:
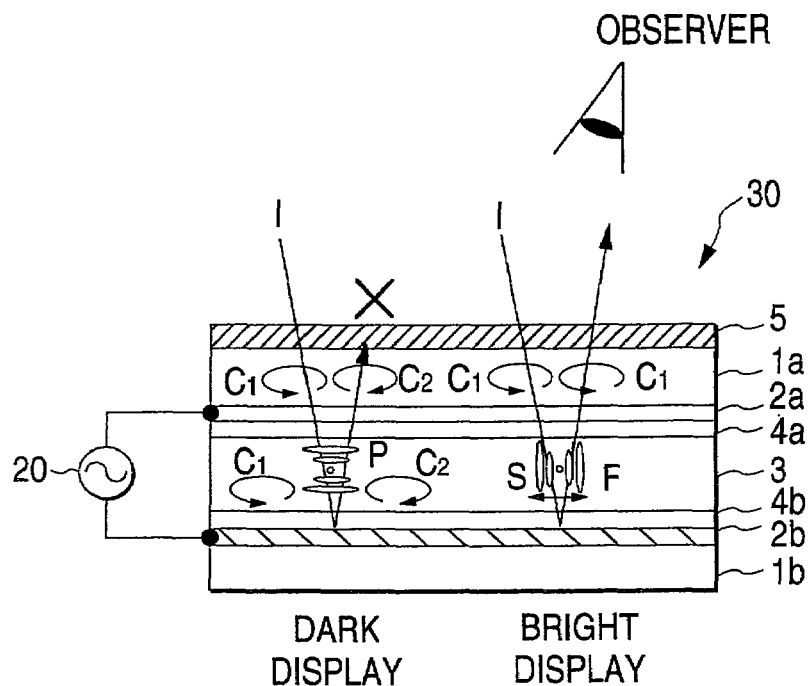
FIG. 3 is a sectional view showing, in model form, a structure of a liquid crystal display element which is a first embodiment of the present invention.

FIG. 3 is a schematic sectional view showing a structure of a liquid crystal display element according to a first embodiment of the invention.

A liquid-crystal display element 30 shown in FIG. 3 includes a planar liquid-crystal layer 3 made of cholesteric liquid crystal, a transparent obverse surface electrode 2a formed on a substrate 1a and a reverse surface electrode 2b, which reflects light and is formed on a substrate 1b. Those electrodes support the obverse side and the reverse side of the liquid crystal layer 3, respectively. An alignment layer 4a is placed between the obverse surface electrode 2a and the liquid crystal layer 3. An alignment layer 4b is laminated between the reverse electrode 2b and the liquid crystal layer 3. A circularly polarizing plate 5 including a ¼ wavelength plate and a linear polarizer is disposed on the surface side of the substrate 1a. A power source 20 is connected to between the obverse surface electrode 2a and the reverse surface electrode 2b, and applies a predetermined voltage between the obverse surface electrode 2a and the reverse electrode 2b.

The liquid crystal layer 3 of the embodiment is formed so that d/p exceeds 1.5, where d is a thickness of the liquid crystal layer and p is a helical pitch of the liquid crystal. As with the liquid crystal display element of the selective reflection type, the P orientation and the F orientation are stable in time. Accordingly, the image can be preserved for a long time.

Further, the product of multiplying the helical pitch by the birefringence is selected to be much smaller than optical wavelength, and the liquid crystal layer may be considered as a negative type optical medium of which the helical axes is coincident with the extraordinary ray axis. Therefore, at the time of the P orientation, the birefringence effect is almost zero, while at the time of the F orientation, the birefringence effect appears. In the embodiment, the thickness d of the liquid crystal layer 3 is adjusted so that the retardation of the liquid crystal layer is one fourth of a wavelength λ of light. Accordingly, in the P orientation, a circularly polarized light C1, which is the incident light I passes through the circularly polarizing plate 5, straightforwardly passes through the liquid crystal layer 3, and is mirror reflected by the reverse electrode 2b. Accordingly, the circularly polarized light C1 is transformed into a circularly polarized light C2, which turns in the direction opposite to that in which the circularly polarized light C1 from the circularly polarizing plate 5 turns. The circularly polarized light C2 is absorbed by the circularly polarizing plate 5 to thereby present black display. On the other hand, in the F orientation, the circularly polarized light C1 from the circularly polarizing plate 5 after the incident light I passes through the circularly polarizing plate 5 is transformed into linearly polarized light S by the birefringence effect of the liquid crystal layer 3 of which the thickness is adjusted to be λ/4. The linearly polarized light reflected by the reverse electrode 2b is transformed into the circularly polarized light C1 again by the birefringence effect of the liquid crystal layer 3. Accordingly, the circularly polarized light passes through the circularly polarizing plate 5 as it is to present bright display.

The liquid-crystal display element 30 of the embodiment utilizes the birefringence effect, not the selective reflection. Accordingly, if the retardation of the liquid crystal layer is appropriately selected, the liquid-crystal display element presents black-and-white display.

A transmittance T of the transmission type liquid crystal display element is proportional to $\sin^2(\pi\Delta n_F \cdot d/\lambda)$ where $\Delta n_F$ is the difference in birefringence in the F orientation, d is a thickness of the liquid crystal layer, and λ is a wavelength of light. Accordingly, to make the transmitted light white, it is necessary that $\Delta n_F \cdot d$ (retardation) is selected so that the transmittance is maximized in a wavelength region in a range of from 440 to 660 nm in which the visibility is the highest.

That is, the transmitted light may be whitened if the retardation $\Delta n \cdot Fd$ is selected to be $\lambda/2$=220 to 330 nm so that $\sin^2(\pi\Delta n_F \cdot d/\lambda)$ is 1.

Actually, it is difficult to directly measure $\Delta n_F$. However, when the cholesteric liquid crystal is observed in a scale, which is much smaller than a helical pitch, it may be considered locally as a uniaxial optical medium of a positive type, like the nematic liquid crystal. It is considered that the half of the liquid crystal molecules being in the F orientation are vertically aligned, while the remaining half of the liquid crystal molecules are horizontally aligned. Therefore, a difference $\Delta n_o$ between a refractive index of the liquid crystal for the ordinary ray and that of the same for the extraordinary ray can be expressed as $\Delta n_o=2 \cdot \Delta n_F$. The refractive index difference $\Delta n_o$ can be measured after voltage is applied to the liquid crystal layer to remove the helical state of the liquid crystal molecules and to uniaxially align the liquid crystal molecules. Accordingly, if a liquid crystal layer, which satisfies the relation $\Delta n_o \cdot d$=440 to 660 nm, is selected and used, the transmitted light can be made white. In the case of the reflection type liquid crystal display element, an optical path length is twice as large as that of the liquid crystal display element of the invention. Accordingly, the liquid crystal display element of the invention presents black/white display if $\Delta n_o \cdot d$ is selected to be 220 to 330 nm, which is half of the former.

In the embodiment, the retardation of the liquid crystal layer is λ/4 when it is in the F orientation. Accordingly, the circularly polarized light C1 emanating from the circularly polarizing plate 5 after the incident light I passes through the circularly polarizing plate 5 is a linearly polarized light S on the reverse electrode 2b, and the circularly polarizing plate 5 transforms it into a circularly polarized light C1 which passes through it. Therefore, the transmitted light is made white, and the reflectance is maximized.

The component parts of the liquid-crystal display element 30 of the instant embodiment will be described.

Examples of materials of the substrates 1a and 1b are transparent dielectric materials, such as 1) glass; 2) resins, e.g., polycarbonate, polyethylene terephthalate and polyethersulfone; 3) ceramic, e.g., PLZT.

Examples of materials of the transparent obverse surface electrode 1a are transparent conductive materials such as conductive oxides, e.g., ITO (Indium Tin Oxide), SnO2, and ZnO:Al and conductive resins, e.g., polypyrrole, and polyaniline. Films may be formed by using those materials by vapor deposition method, sputtering method, ion plating method, sol-gel method, coating method, printing method or electro-deposition method. After the film formation, the film is formed into a desired shape by lithography process or the like.

A material having conductive and light reflecting properties, such as Substrate Al, Ag, Cr, Ti, or the like is used as reverse electrode 2b for reflecting light. If the polarization of light is removed by the reflecting electrode 2b, the contrast of display lowers. Therefore, the surface of the reflecting electrode 2b is preferably a mirror surface or a near mirror-surface.

When the reverse electrode having a mirror-finished surface is used for the liquid crystal display element, it is necessary to prevent an exterior scene from being reflected on the electrode surface. To this end, it is preferable to additionally use a light scattering plate or to make the surface of the reflecting electrode 2b rough to give the light scattering property to the electrode surface. In the instant embodiment, the liquid crystal layer 3 being put in the F orientation has the light scattering property at the time of bright display. It is possible to prevent an exterior scene from being reflected on the electrode surface without use of the light scattering plate.

The cholesteric liquid crystal being in the F orientation has domain structure of a size of several μm to several tens μm is present. The helical axes of the liquid crystal molecules are randomly oriented in a plane parallel to the substrate in each domain. For this reason, when the reflecting electrode 2b is used, the incident light and its reflecting light pass through one and the same domain. A phase difference caused in the light is simply two times as large as that in the case of one passing. In another structure that the reflecting electrode 2b is a transparent electrode, and a light reflecting layer is formed outside the substrate 1b, the incident light passes through a domain, and the reflecting light passes through another domain. The phase differences caused take a probability distribution depending on the directions of the helical axes in the domains through which the lights pass. The spectral representation flattens out, and this partly contributes to the whitening of light. However, the amount of light absorbed by the circularly polarizing plate 5 increases, so that the reflectivity somewhat decreases.

In the embodiment, the reverse electrode 2b serves also as the light reflecting layer. Accordingly, the liquid crystal display element of the embodiment is free from the formation of the double image due to the parallax, and the decrease of the reflectivity.

The alignment layers 4a and 4b may be known alignment layer material made of resin such as polyimide or polyester, surface-active agent such as the silane series or the amine series, or inorganic film such as diagonally vapor deposited SiOX films. The orientation property of the alignment layer 4a and 4b may be the perpendicular or horizontal orientation. The function of the alignment layers 4a and 4b in the instant embodiment is different from that in the BTN type liquid crystal display element. In the embodiment, those alignment layers are provided not for unidirectionally determining the orientation of the liquid crystal molecules, but for securing the uniformity of display, and improving the reflectivity and contrast at the bright display time.

If the alignment layer with a strong horizontal uniaxial orientation property, such as a the rubbed alignment layer, is used for the alignment layers 4a and 4b on both the obverse and reverse sides, the P orientation is remarkably stable, and hence the bistability is impaired. To avoid this, by using one and/or both of the alignment layers 4a and 4b, an orientation anchoring strength (strength of energy to uniaxially align the liquid crystal molecules in a plane parallel to the substrate surface) of $1/10^4$ (J/m$^2$) or smaller is given to the boundary between the alignment layer and the liquid crystal layer 3. A long-time preservation of display when the liquid crystal is in the F orientation is secured. Preferably, the anchoring strength is not more than $1/10^4$ (J/m$^2$), more preferably, not more than $3/10^5$ (J/m$^2$).

To put the dark display on a firm basis in the P orientation, it is necessary that the helical axis is parallel to the substrate. It is known that in the normal liquid crystal display element, the liquid crystal molecules are aligned such that the helical axes of the liquid crystal molecules are inclined in relation to the tangential line of the substrate by angles of ±several degrees. Where the helical axis is inclined, the birefringence effect occurs in the liquid crystal layer 3. Accordingly, even at the dark display time, part of light passes through the circularly polarizing plate, so that the contrast lowers at the dark display and the bright display.

An effective approach to reduce the inclination of the helical axis without impairing the bistability is that by using one of the alignment layers 4a and 4b, an orientation anchoring strength of $1/10^4$ (J/m$^2$) or larger is given to the boundary between the alignment layer and the liquid crystal layer 3. Accordingly, a strong anchoring alignment layer, more exactly a rubbed alignment layer, is preferably used for one of the alignment layers. Preferably, the anchoring strength is not less than $1/10^4$ (J/m$^2$), more preferably, not less than $3/10^4$ (J/m$^2$).

A cholesteric liquid crystal material used for the liquid crystal layer 3 may be a liquid crystal composition prepared by adding chiral agent containing an optically active compound, e.g., a compound containing an optically active group, e.g., cholesterol derivative or 2-methylbutyl group, to a known nematic liquid crystal composition such as the cyanobiphenyl series, phenylcyclohexyl series, phenylbenzoate series, cyclohexyl-benzoate series, azomethine series, azobenzene series, pyrimidine series, dioxane series, cyclohexyl-cyclohexane series, stilbene series, and the tolan series. The liquid crystal composition per se may be the optically active compound, as a matter of course. If necessary, an additive, e.g., dyestuff, or fine particles, may be added to the liquid crystal material. The cholesteric liquid crystal may take the form of a complex material, such as a complex material prepared by dispersing the liquid crystal into a matrix containing high-polymer or inorganic material, a complex material prepared by gelling it by use of cross-linking polymer or hydrogen-bond gelling agent, or a complex material prepared by microcapsuling the liquid crystal. The cholesteric liquid crystal may be high-polymer (molecular) liquid crystal, middle-molecular liquid crystal or low-molecular liquid crystal, or a mixture of those materials.

A thickness d of the liquid crystal layer 3 is within a range from 1 μm to 20 μm. If the thickness is below the thickness range, a chance of the short circuit between the electrode 2a and 2b increases, resulting in decrease of production yielding. If it exceeds the thickness range, the drive voltage increases, and hence the cost to manufacture the drive circuit increases. If the ratio d/p of the thickness d of the liquid crystal layer 3 to the helical pitch p is below 1, the F orientation is instable, and it is difficult to secure the bistability. Therefore, it is necessary that the ratio satisfies d/p>1.5. Since the threshold voltage is in proportion to the ratio d/p, in view of the drive voltage, it is preferable that the ratio d/p is small. In practice, it is preferable that the ratio d/p is set to be less than 20. More preferably, the ratio d/p is set to be less than 10.

In view of the above, it is necessary, for example, that when d=1 μm, p satisfies to be less than 0.6 μm and that when d=20 μm, p satisfies to be less than 13 μM. When d is in a range of from 1 μm to 20 μm, it is necessary to appropriately set p so that the ratio d/p is more than 1.5.

In the P orientation, it is necessary to break the Mauguin condition for preventing the birefringence effect. To this end, it is necessary to satisfy the following relation $$\Delta n_o \cdot p < \lambda / n$$

where λ is wavelength of light and n is the average refractive index of the cholesteric liquid crystal. Generally, n is about 1.5, λ is in a range of from 0.4 μm to 0.8 μm, and $\Delta n_0$ is in a range of from 0.05 to 0.25.

When λ is small and $\Delta n_0$ is large, p for breaking the Mauguin condition becomes the smallest. For example, when λ=0.4 μm and $\Delta n_0$=0.25, it is necessary that p is less than 1.1 μm. When λ=0.8 μm and $\Delta n_0$=0.05, it is necessary that p is less than 11 μm.

To satisfy two conditions on the helical pitch, if the helical pitch is about 1 μm or shorter, the liquid crystal display element may be made to exhibit its functions independently of n, $\Delta n_o$, and λ.

When those factors n, $\Delta n_o$, and λ of the liquid crystal display element used are previously determined, the helical pitch p may be set within a range from approximately 1 to 10 μm, and $\Delta n_o$ may be selected to be within a range within which a desired retardation is obtained.

In the liquid-crystal display element 30 of the invention, liquid crystal of low viscosity whose $\Delta n_o$ value is smaller than that in the liquid crystal display element of the selective reflection type, may be used. For this reason, the liquid-crystal display element of the invention is advantageous in response speed. The black/white display is allowed when the retardation $\Delta n_o \cdot d$ of the liquid crystal layer 3 is in a range of from 220 to 330 nm for the reflection type of the display element, and is in a range of 440 to 660 nm for the transmission type display element. If the retardation is out of the ranges, light is colored at the bright display time.

The colored display by the liquid-crystal display element 30 may be performed by utilizing the coloring operation.

The circularly polarizing plate 5 permits one of the right- and left-handed circularly polarized lights to pass therethrough, and absorbs the other light. The circularly polarizing plate includes a lamination of a linearly polarizing plate which allow light to uniaxially pass therethrough, and a ¼λ plate (referred to as a phase plate) for retarding a phase of a vibrating plane of light. An angle between the polarization axis of the linearly polarizing plate and the optical axis of the phase difference plate is π/4. To obtain perfect black at the dark display time, such a phase difference plate as to produce a retardation of λ/4 over the entire visible wavelength region, is required. Generally, the stretching polymer film used for the phase difference plate has such a wavelength dispersion that the retardation becomes smaller as the longer the wavelength is. Therefore, the phase difference plate as required may be realized in a manner that two types of stretching polymer films being different in wavelength dispersion are bonded together, while being orthogonally arrayed.

The instant embodiment uses the circularly polarizing plate constructed using such a phase difference plate.

The cholesteric liquid crystal in the P orientation time is a negative type optical medium of which the extraordinary light axis is parallel to the normal line of the substrate.

Accordingly, when the display is obliquely viewed, the birefringence effects appears, and sometimes the contrast of display lowers. To prevent this, the contrast lowering may be optically compensated by placing, between the liquid crystal layer 3 and the circularly polarizing plate, a phase compensating film which includes a positive uniaxial optical medium having an extraordinary light axis aligned with a normal line of the circularly polarizing plate 5 and being equivalent to a plane developed by the director of the liquid crystal layer. The phase compensating film is combined with the λ/4 plate, and a refractive index of the ¼ wavelength plate in the thickness direction thereof is larger than a refractive index of the ¼ wavelength plate in any direction in a plane being in contact with the linearly polarizing plate. Then, a phase difference caused in the cholesteric liquid crystal being in the P orientation is opposite in sign to that caused in the phase compensating film, when obliquely viewed. Therefore, those phases are cancelled out and the lowering of the contrast is suppressed.

A switching operation of the liquid-crystal display element 30 of the instant embodiment will be described hereunder.

Figure 4:
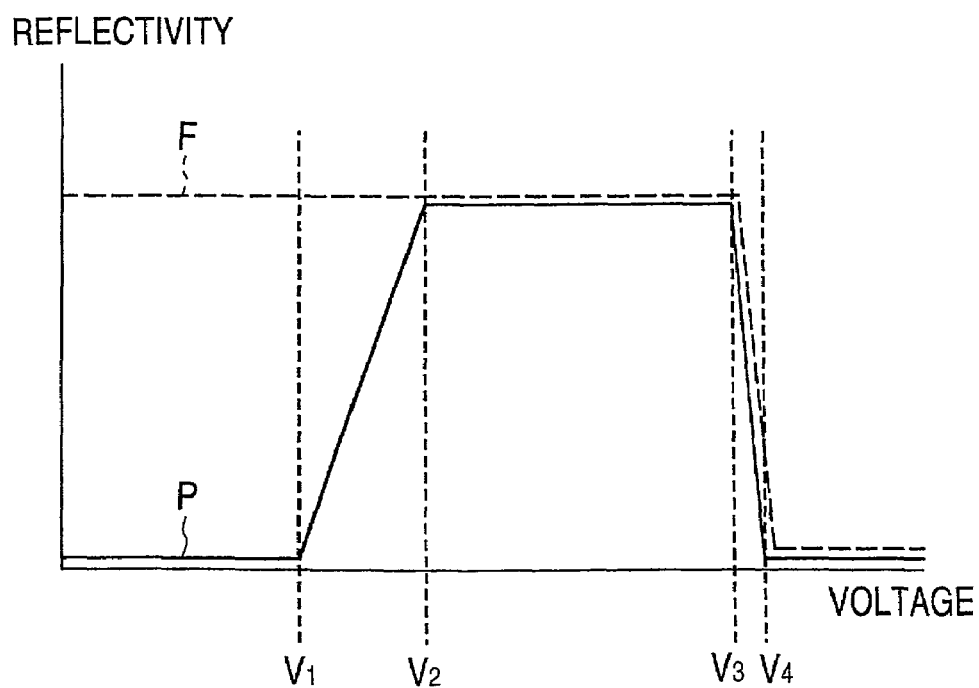
FIG. 4 is a graph showing a reflectivity-voltage characteristic of the liquid crystal display element as measured after a fixed voltage is applied to the liquid crystal layer and is removed.

FIG. 4 is a graph showing, in model form, a reflectivity-voltage characteristic of the liquid crystal display element as measured after a fixed voltage is applied to and removed from the liquid crystal layer.

In the graph of FIG. 4, the ordinate represents a reflectivity of the liquid crystal layer, and the abscissa represents voltage applied. A dotted line F represents a case that the initial orientation is the F orientation, and a solid line P is a case where the initial orientation is the P orientation. In this instance, the liquid crystal layer is of the reflection type, and hence the ordinate represents a reflectivity of the liquid crystal layer. In the case of the semitransmission type, transmittance is used in place of the reflectivity, and the same thing holds in this type of the liquid crystal layer.

In a range where the application voltage is lower than V1, the orientation of the cholesteric liquid crystal remains unchanged. Therefore, its reflectivity also remains unchanged irrespective of the initial orientation. In a range where V2<application voltage<V3, the F orientation is stable, and the bright display is presented. In a range of higher than V4, the P orientation is stable and the dark display is presented. The voltage V4 corresponds to the cholesteric-nematic phase transition threshold voltage. Therefore, the dark/bright of the display may be controlled by applying a voltage within the range of V3 to V4 or by initializing the orientation to the P orientation and applying a voltage within the range from V1 to V2.

When the applying voltage is in a range of V3<V<V4 or V1<V<V2, a half tone is displayed. At this time, in the liquid crystal layer 3, the domains of the P orientation and the F orientation microscopically coexist. This state is stable with time. Therefore, the liquid crystal display element of the embodiment is capable of sustaining half tone display for a long time.

When a voltage application time is sufficiently long, the threshold voltage value of cholesteric-nematic phase transition is equal to V4 and is given by $$Vcn = (\pi^2 \cdot d/p) \cdot \sqrt{(K_{22}/\epsilon_0 \cdot \Delta\epsilon)}$$

where p: helical pitch, $K_{22}$: twisted orientation elastic modulus, $\epsilon_o$: the vacuum dielectric constant, and $\Delta\epsilon$: dielectric anisotropy. Accordingly, to lower the drive voltage, d/p and $K_{22}$ are selected to be small, and $\Delta\epsilon$ is selected to be large.

The liquid crystal display element of the embodiment is in the P orientation of weak light scattering property at the time of dark display, and in the F orientation of strong light scattering property at the time of bright display. In the case of the reflection type display, the display is seen brightly when the light scattering property is strong to some extent at the time of bright display. Accordingly, the strong light scattering property is favorable, and it increases the contrast.

The liquid crystal display element of the embodiment may be used in any of the form of a segment display element, a simple matrix display element and an active matrix display element. The display element may also be used not only for the black/white display but also for the color display when it is combined with a color filter. The helical pitch of the cholesteric liquid crystal may be selected so that the reflected light is in the visible wavelength region. However, coloring will occur at dark display time. When the helical pitch is selected so that the selective reflected light is in the near infrared wavelength region, coloring does not occur when viewed from front. When viewed in the oblique direction, the light is colored as the result of the short wavelength shift of the selective reflected light wavelength. The coloring of light may be avoided in a manner that the circularly polarized light component, which is selectively reflected by the cholesteric liquid crystal, has the same rotational direction as that of the circularly polarized light component, which is absorbed by the circularly polarizing plate located on the observer's side.

A liquid crystal display element of a second embodiment according to the invention will be described.

The second embodiment is substantially the same as the first embodiment except that the reverse electrode is a reflection electrode of the semi-transmissive type, the circularly polarizing plate is provided outside it, and a back light is provided outside the circularly polarizing plate. Description will be given placing emphasis on the different points.

Figure 5:
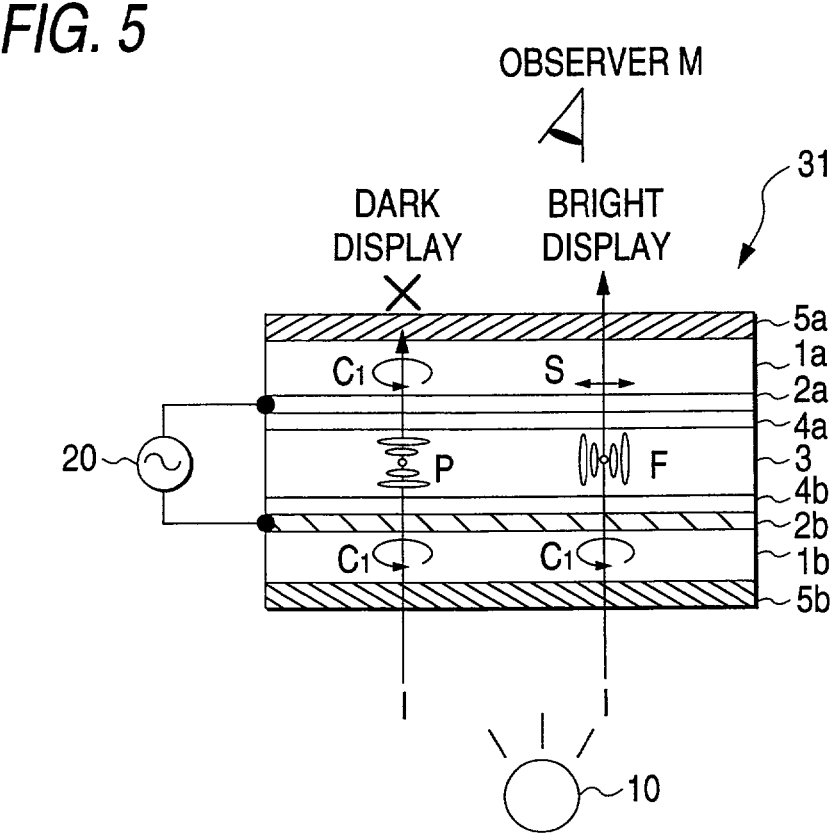
FIG. 5 is a sectional view showing, in model form, a structure of a liquid crystal display element which is a second embodiment of the invention.

FIG. 5 is a sectional view showing, in model form, a structure of the liquid crystal display element of the second embodiment.

A liquid crystal display element 31 shown in FIG. 5 includes a lamination of a planar liquid crystal layer 3 having obverse and reverse surfaces, a substrate 1a, and another substrate 1b. The substrate 1a includes a transparent obverse surface electrode 2a on the obverse side of the liquid crystal layer 3. The substrate 1b includes a semi-transmissive reflection electrode 2b serving as a light reflection layer, which is on the reverse side of the liquid crystal layer 3. The alignment layer 4a is disposed between the electrode 2a and the liquid crystal layer 3. The alignment layer 4b is disposed between the electrode 2b and the liquid crystal layer 3. A circularly polarizing plate 5a is provided on the outer surface of the substrate 1a, and a circularly polarizing plate 5b is provided on the outer surface of the substrate 1b. The polarization axes of the circularly polarizing plates 5a and 5b are orthogonal to each other. A back light 10 is disposed on the side opposite to the observer M who is present in the obverse side of the liquid crystal layer 3, and the back light 10 is in the reverse side of the liquid crystal layer 3.

The retardation $\Delta n_o \cdot d$ of the liquid crystal layer 3 is selected to be 220 to 330 nm. The retardation so selected satisfies the condition to make the display white when the liquid-crystal display element 31 functions as the reflection type display element. However, the retardation so selected does not satisfy the condition to make the display white when it functions as the transmission type display element.

In this case, bluish color is presented in bright display. This color shading can be corrected by making the light source color of the back light 10 somewhat reddish.

A semi-transmissive property may be given to the semi-transmissive reflecting electrode 2b in a manner that a material having both conductive and light reflecting properties, e.g., Al, Ag, Cr and Ti, is thinned to such an extent as to allow light to pass therethrough, or a transmission window is locally formed by etching process or the like.

The liquid-crystal display element 31 of the instant embodiment operates as a reflection type display element when the back light is turned off, and it functions as a transmission type display element when the back light is turned on.

When the back light 10 is turned on, the incident light I coming from the rear side where the back light lights up passes through the circularly polarizing plate 5b to be a circularly polarized light C1. When the liquid crystal layer 3 is in the P orientation, no birefringence effect is present. The light directly passes therethrough, and the transmitted circularly polarized light C1 is absorbed by the circularly polarizing plate 5a, which is oriented orthogonally to the circularly polarizing plate 5b, and dark display is presented. When the liquid crystal layer 3 is in the F orientation, the light is transformed into a linearly polarized light S by the birefringence effect of the liquid crystal layer 3 corresponding to λ/4, and part of the light passes through the circularly polarizing plate 5a, and as a result, bright display is presented.

The operation of the reflection type display element when the back light 10 is turned off is similar to that of the first embodiment. Hence, no further description of it will be given.

With such a unique construction, the liquid crystal display element visually presents display even in a dark place. Further, the contrast lowering problem is avoided since the back light, not the front light, is used.

A third embodiment of a liquid crystal display element according to the present invention will be described.

Figure 6:
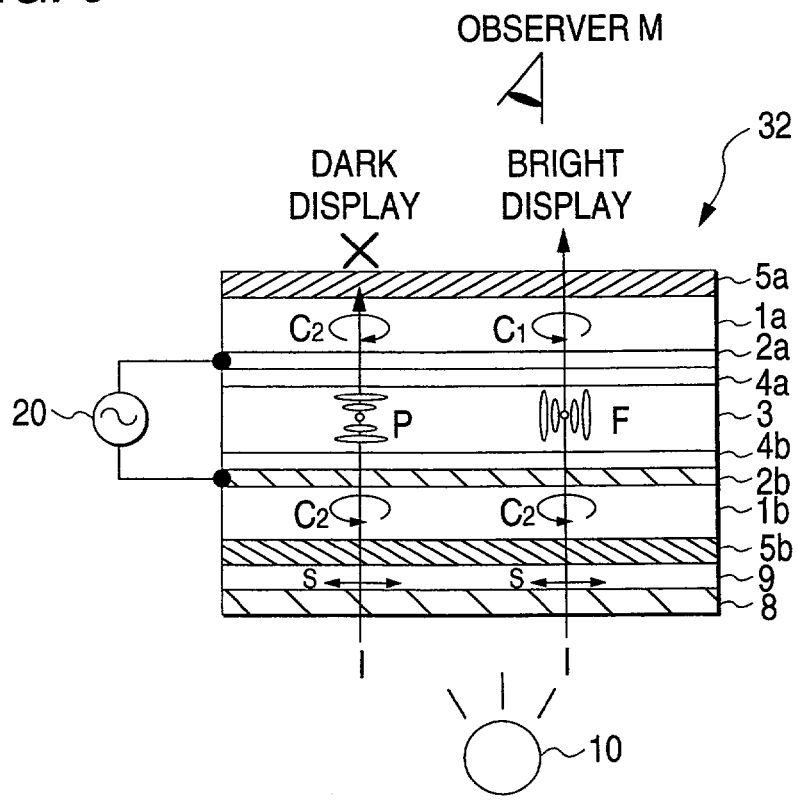
FIG. 6 is a sectional view showing, in model form, a structure of a liquid crystal display element which is a third embodiment of the invention.

FIG. 6 is a sectional view showing, in model form, a structure of a liquid crystal display element which is a third embodiment of the invention.

The liquid crystal display element of the instant embodiment is substantially the same as that of the second embodiment, except that the reverse electrode is a transparent electrode, and a semi-transmissive reflecting plate is provided outside the circularly polarizing plate on the reverse side. Accordingly, like or equivalent portions are designated by like reference numerals used in the embodiments mentioned above. Description of them will be omitted.

The liquid-crystal display element 32 shown in FIG. 6 includes a lamination of a planar liquid crystal layer 3 having an obverse surface and a reverse surface, a substrate 1a having an obverse surface electrode 2a on the obverse surface side of the liquid crystal layer 3, and a substrate 1b having a transparent reverse electrode 2b on the reverse surface side thereof. An alignment layer 4a is interposed between the obverse surface electrode 2a. and the liquid crystal layer 3, and an alignment layer 4b is interposed between the reflecting electrode 2b and the liquid crystal layer 3. A circularly polarizing plate 5a is provided on the outer surface substrate 1a, and a circularly polarizing plate 5b is provided on the outer surface of the substrate 1b. The circularly polarizing plate 5a and the circularly polarizing plate 5b are arranged such that their polarization axes are orthogonal to each other. A ¼ wavelength plate 9 and a semitransmission type reflection plate 8 are provided on the outer surface of the circularly polarizing plate 5b. A back light 10 is disposed on the side opposite to an observer M who is on the obverse surface side of the liquid crystal layer 3, and on the outer side of the semitransmission type reflection plate 8.

The retardation $\Delta n_o \cdot d$ of the liquid crystal layer 3 is selected to be 440 to 660 nm. The same material as of the reverse electrode in the second embodiment may be used for the semitransmission type reflection plate. In this case, the electric conduction property is not needed, a dielectric multi-layer may be used.

The liquid-crystal display element 32 of the instant embodiment operates as a reflection type display element when the back light is turned off, and it functions as a transmission type display element when the back light is turned on.

When the back light 10 is turned on, the incident light I coming from the rear side where the back light lights up is not polarized even after it passes through the ¼ wavelength plate 9 since it is a light not polarized. And after it passes through the circularly polarizing plate 5b to be a circularly polarized light C2. When the liquid crystal layer 3 is in the P orientation, no birefringence effect is present. The light directly passes therethrough, and the transmitted circularly polarized light C2 is absorbed by the circularly polarizing plate 5a, which is oriented orthogonally to the circularly polarizing plate 5b, and dark display is presented. When the liquid crystal layer 3 is in the F orientation, the light is transformed into a circularly polarized light C1 S by the birefringence effect of the liquid crystal layer 3 corresponding to λ/2, and it passes through the circularly polarizing plate 5a, and as a result, bright display is presented. When the liquid crystal layer 3 is in the F orientation, the light is transformed into a linearly polarized light S by the birefringence effect of the liquid crystal layer 3 corresponding to λ/4, and part of the light passes through the circularly polarizing plate 5a, and as a result, bright display is presented.

Figure 7:
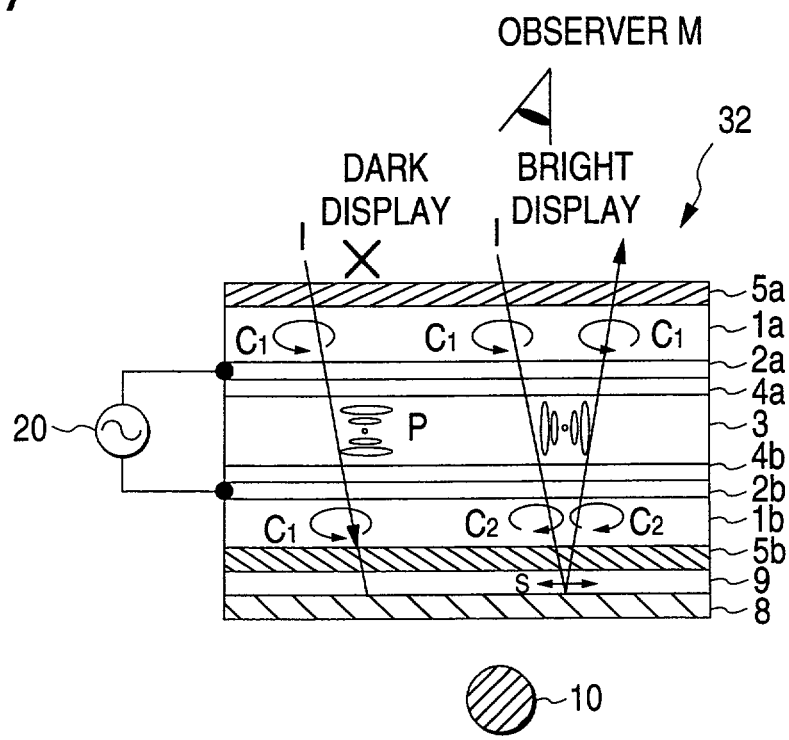
FIG. 7 is a sectional view for explaining an operation of the reflection type display element when the back light is turned off.

FIG. 7 is a sectional view for explaining an operation of the reflection type display element when the back light is turned off.

The liquid crystal display element shown in FIG. 7 is the same as the liquid crystal display element shown in FIG. 6, except that the back light is turned off.

Incident light I coming from the observer M side on the obverse surface of the liquid crystal layer 3 passes through the circularly polarizing plate 5a, and then is transformed into a circularly polarized light C1. When the liquid crystal layer 3 is in the P orientation, the circularly polarized light C1 after passing through the liquid crystal layer 3 is absorbed by the circularly polarizing plate 5b, located orthogonally to the circularly polarizing plate 5a. Accordingly, the light does not reach the observer, and bright display is presented. When the liquid crystal layer 3 is in the F orientation, the circularly polarized light C1 after passing through the circularly polarizing plate 5a is transformed into a circularly polarized light C2 by the birefringence effect of the liquid crystal layer 3 corresponding to λ/2. Accordingly, it passes through the circularly polarizing plate 5b, and it is transformed into a linearly polarized light S by the ¼ wavelength plate 9. The linearly polarized light S is directly reflected by the semi-transmission type reflection plate 8, part of the light passes through the circularly polarizing plate 5b to be a circularly polarized light C2, and is transformed into a circularly polarized light C1 by the liquid crystal layer 3. As a result, it passes through the circularly polarizing plate 5a, thereby presenting bright display.

EXAMPLES

Examples of the liquid crystal display element constructed according to the present invention will be described.

Example 1

Glass substrate with ITO electrodes, commercially available, were used for the substrate 1a and the obverse surface electrode 2a. An Al film of 0.5 μm thick was formed, by sputtering process, on the substrate 1b, and the resultant was used for the reverse electrode 2b. The alignment layers 4a and 4b were omitted. Spherical silica spacer of 1.6 μm in diameter was sprayed over the substrate 1b, and bonded to the substrate 1a by sealing material as coated with an opening left. Cholesteric liquid crystal, which is 0.22 μm in helical pitch and selectively reflects the right-handed circularly polarized light, was prepared by mixing 7.3 wt % of nematic liquid crystal adjusted so that Δn=0.20, 21.6 wt % of chiral agent (type S811 made by Merc Co. Inc.,), and 5.4 wt % of chiral agent (type S1011 made by Merc Co. Inc.,), and injected into between the glass substrates. A circularly polarizing plate allowing a left-handed circularly polarized light to pass there through was stuck to the substrate 1a. The circularly polarizing plate was a lamination of a ¼λ plate (SEF-¼λ, made by Sumitomo Chemical Co., Ltd.) and a linearly polarizing plate (SH-1852AP, made by Sumitomo Chemical Co., Ltd.). $\Delta n_o$=0.15, d=1.67 μm, $\Delta n_o \cdot d$=0.25 μm, and d/p=7.3.

Figure 8:
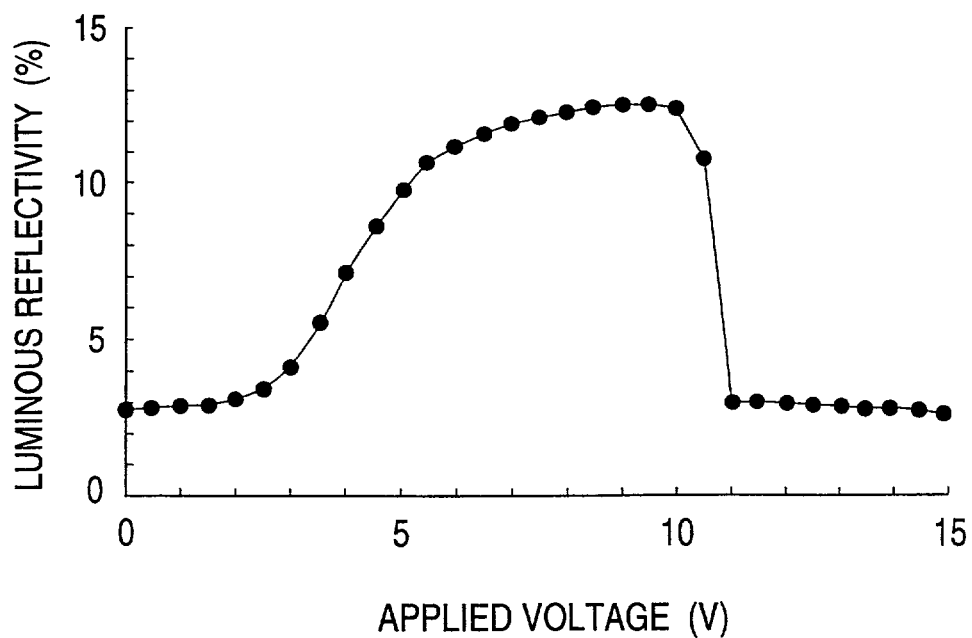
FIG. 8 is a graph showing a reflectivity-voltage characteristic of the liquid crystal display element.
Figure 9:
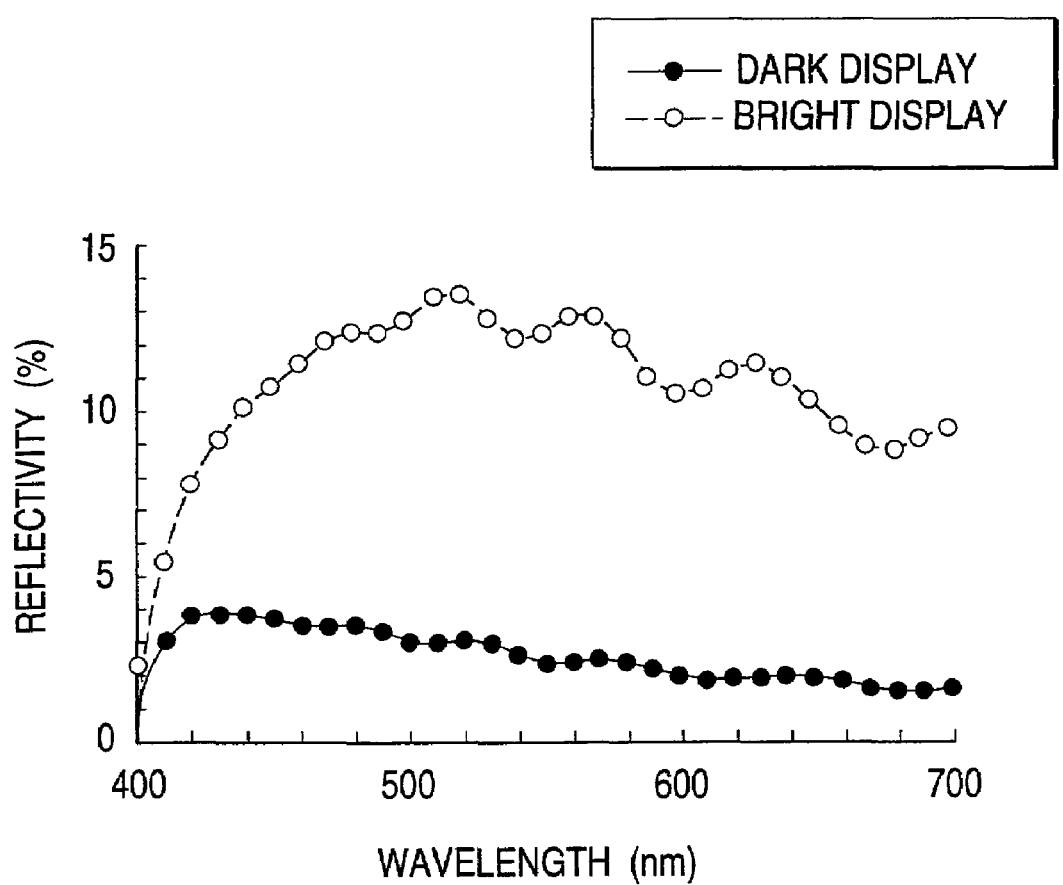
FIG. 9 is a graph showing reflection spectra of the liquid crystal under illumination by a D65 light source.

A reflectivity-voltage characteristic is shown in FIG. 8, which was measured after a symmetrical rectangular wave voltage of 1 KHz is applied to the example display element for 100 ms in a state that the initial orientation is set to be the P orientation. A spectrophotometer (CM-2022, made by Minolta Co., Ltd.) was used for measuring the reflectivity and the reflection spectrum. The example display element could be driven at an extremely low voltage V4=11V. The reflection spectra as measured under the D65 light source is shown in FIG. 9. A contrast ratio of luminous reflectance was 5.1. In the XY chromaticity coordinates, (0.31, 0.35) was obtained at the bright display time, and indicates color of almost white. The liquid crystal display element presenting bright display was stored for three months. After three months, little color change of display was confirmed.

Example 2

Glass substrate with ITO electrodes, commercially available, were used for the substrate 1a and the obverse surface electrode 2a. An Al film of 0.5 μm thick was formed, by sputtering process, on the substrate 1b, and the resultant was used for the reverse electrode 2b. Polyvinyl alcohol was used for the alignment layers 4a and 4b. The alignment layer 4a was subjected to the rubbing treatment. Spherical silica spacer of 3.5 μm in diameter was sprayed over the substrate 1b, and bonded to the substrate 1a by sealing material as coated with an opening left. Cholesteric liquid crystal, which is 0.89 μm in helical pitch and selectively reflects the right-handed circularly polarized light, was prepared by mixing 90 wt % of nematic liquid crystal (ZLI-4792) whose Δn=0.094, 8 wt % of chiral agent (type S811 made by Merc Co. Inc.,), and 2 wt % of chiral agent (type S1011 made by Merc Co. Inc.,). The resultant liquid crystal was injected into between the glass substrates as well as the one above. A circularly polarizing plate allowing a left-handed circularly polarized light to pass therethrough was stuck to the substrate 1a. The circularly polarizing plate was a lamination of a ¼ λplate (SEF-¼λ, made by Sumitomo Chemical Co., Ltd.) and a linearly polarizing plate (SH-1852AP, made by Sumitomo Chemical Co., Ltd.). $\Delta n_o$=0.085, d=3.5 μm, $\Delta n_o \cdot d$=0.30 μm, and d/p=4.0. The reflectivity and the reflection spectrum were measured in the same manner as of the example 1. The contrast ratio of luminous reflectance was 7.5. (0.35, 0.37) of XY chromaticity coordinates was obtained at the bright display time, and indicates color of almost white. The liquid crystal display element presenting dark display was stored for three months. After three months, little color change of display was confirmed.

As seen from the foregoing description, the present invention succeeds in providing a liquid crystal display element which is capable of sustaining an image for a long time and presenting black/white display.

What is claimed is:

1. A liquid crystal display element comprising:
   a liquid crystal layer made of cholesteric liquid crystal;
   a first circularly polarizing plate for circularly polarizing light;
   wherein the liquid crystal layer has the following relation:
   d/p<1.5, where d is a thickness of the liquid crystal layer and p is a helical pitch of the cholesteric liquid crystal, and
   the liquid crystal layer selectively reflects incident light; and
   wherein a rotating direction of a vibrating plane of the selectively reflected light is the same as that of a vibrating plane of light absorbed by the first circularly polarizing plate.

2. The liquid crystal display element according to claim 1, wherein the liquid crystal layer has a planar shape and further includes a second surface; and
   wherein a boundary of at least one of the first and second surfaces has an anchoring strength in relation to an axis to which the liquid crystal layer is easily aligned, the anchoring strength is not more than $1/10^4$ J/m².

3. The liquid crystal display element according to claim 1, wherein the liquid crystal layer has a planar shape and further includes a second surface;
   wherein at least one of the first and second surfaces has a uniaxial orientation property; and
   wherein a boundary of the at least one of the first and second surfaces has an anchoring strength in relation to the orientation axis smaller than $1/10^4$ J/m².

4. The liquid crystal display element according to claim 1, further comprising a light reflection layer for reflecting light,
   wherein the liquid crystal layer further includes a second surface;
   wherein the first circularly polarizing plate is laminated on the first surface; and
   wherein the light reflection layer is laminated on the second surface.

5. The liquid crystal display element according to claim 4, wherein the liquid crystal layer includes a first electrode on the first surface; and
   wherein the light reflection layer is a second electrode.

6. A liquid crystal display element comprising:
   a liquid crystal layer made of cholesteric liquid crystal;
   a first circularly polarizing plate for circularly polarizing light;
   wherein the liquid crystal layer has the following relation:
   d/p>1.5, where d is a thickness of the liquid crystal layer and p is a helical pitch of the cholesteric liquid crystal, and wherein a retardation of the liquid crystal layer is not less than 220 nm and not more than 330 nm.

7. The liquid crystal display element according to claim 6, wherein the liquid crystal layer has a planar shape and further includes a second surface; and
wherein a boundary of at least one of the first and second surfaces has an anchoring strength in relation to an axis to which the liquid crystal layer is easily aligned, the anchoring strength is not more than $1/10^4$ J/m$^2$.

8. The liquid crystal display element according to claim 6, wherein the liquid crystal layer has a planar shape and further includes a second surface;
wherein at least one of the first and second surfaces has a uniaxial orientation property; and
wherein a boundary of the at least one of the first and second surfaces has an anchoring strength in relation to the orientation axis smaller than $1/10^4$ J/m$^2$.

9. A liquid crystal display element comprising:
a liquid crystal layer made of cholesteric liquid crystal;
a first circularly polarizing plate for circularly polarizing light;
wherein the liquid crystal layer has the following relation:
d/p>1.5, where d is a thickness of the liquid crystal layer and p is a helical pitch of the cholesteric liquid crystal;
a phase compensating plate having an extraordinary light axis parallel to a normal axis of the first circularly polarizing plate,
wherein the phase compensating plate is laminated between the liquid crystal layer and the first circularly polarizing plate; and
wherein the phase compensating plate includes a positive uniaxial optical medium for optically compensating contrast in relation to oblique light, the positive uniaxial optical medium is equal to a plane developed by a director of the liquid crystal layer.

10. A liquid crystal display element comprising:
a liquid crystal layer made of cholesteric liquid crystal;
a first circularly polarizing plate for circularly polarizing light;
wherein the liquid crystal layer has the following relation:
d/p>1.5, where d is a thickness of the liquid crystal layer and p is a helical pitch of the cholesteric liquid crystal;
wherein the circularly polarizing plate includes a lamination of a linearly polarizing plate for allowing light to uniaxially pass therethrough and a ¼ wavelength plate for retarding the phase of a vibrating plane of light; and
wherein refractive index of the ¼ wavelength plate in a thickness direction thereof is larger than refractive index of the ¼ wavelength plate in any direction on a plane, which is on the ¼ wavelength plate and contacts with the linearly polarizing plate.

* * * * *